March 29, 1966  H. G. KEWLEY  3,243,245
FRAME STRUCTURES AND THE JOINING OF MEMBERS
Filed Jan. 22, 1963  4 Sheets-Sheet 1

Inventor
Henry George Kewley
By Dowell Dowell
Attorneys

March 29, 1966 H. G. KEWLEY 3,243,245
FRAME STRUCTURES AND THE JOINING OF MEMBERS
Filed Jan. 22, 1963 4 Sheets-Sheet 2
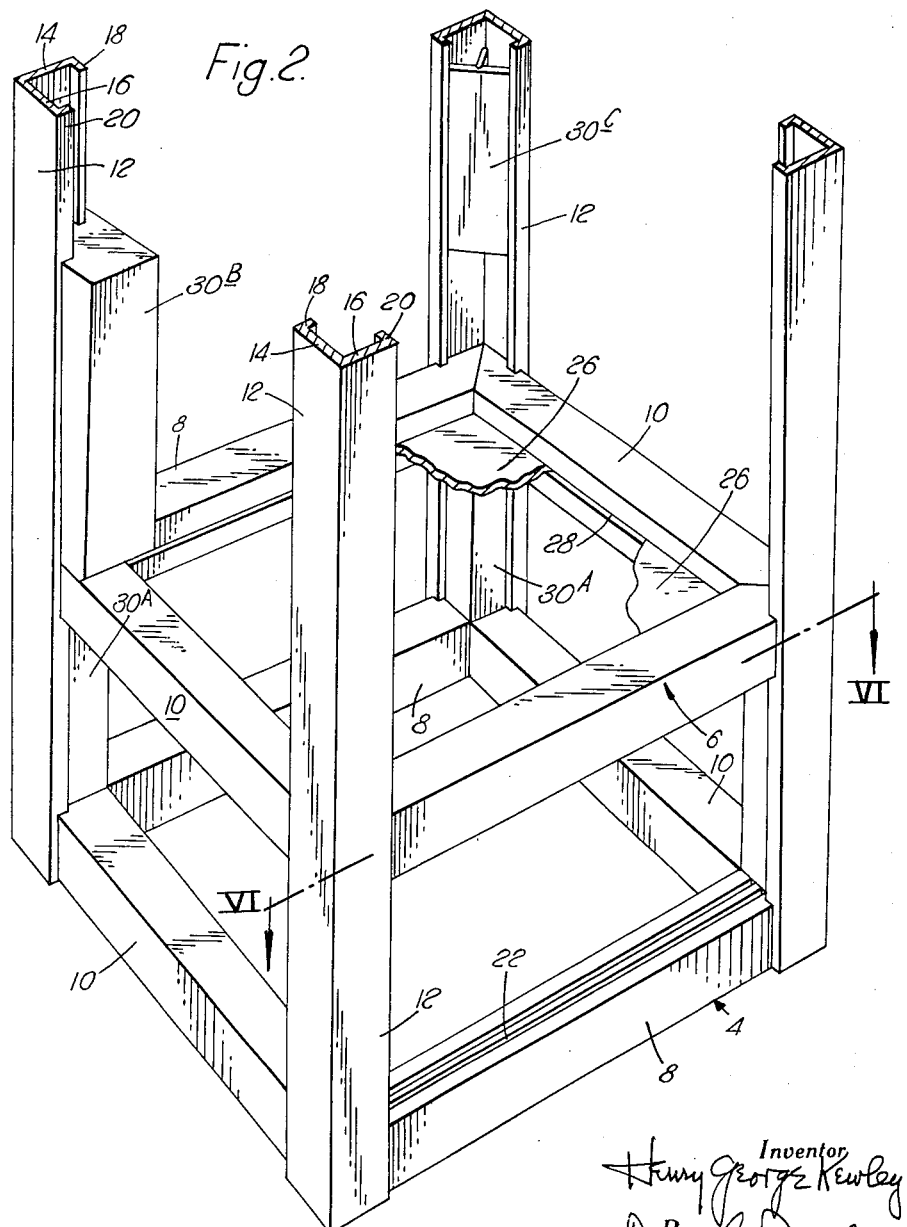

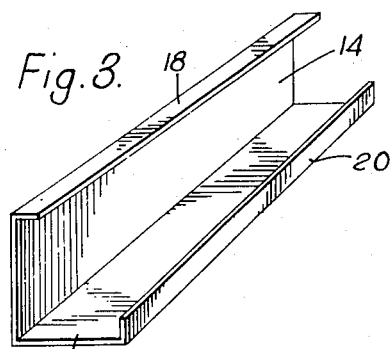
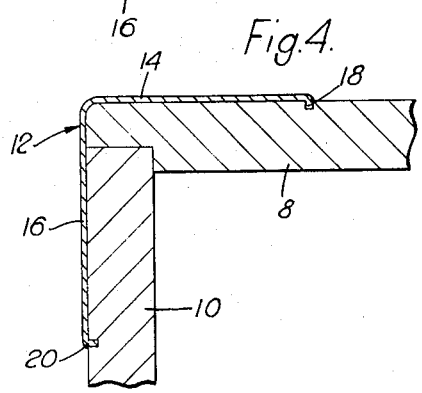
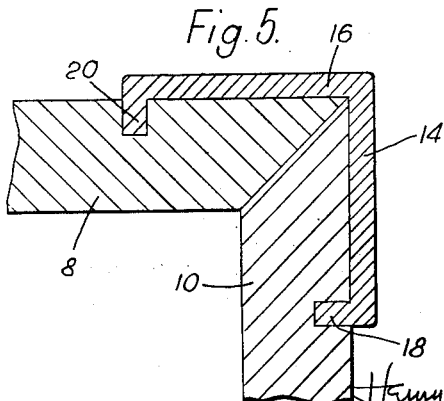

March 29, 1966    H. G. KEWLEY    3,243,245
FRAME STRUCTURES AND THE JOINING OF MEMBERS
Filed Jan. 22, 1963    4 Sheets-Sheet 4
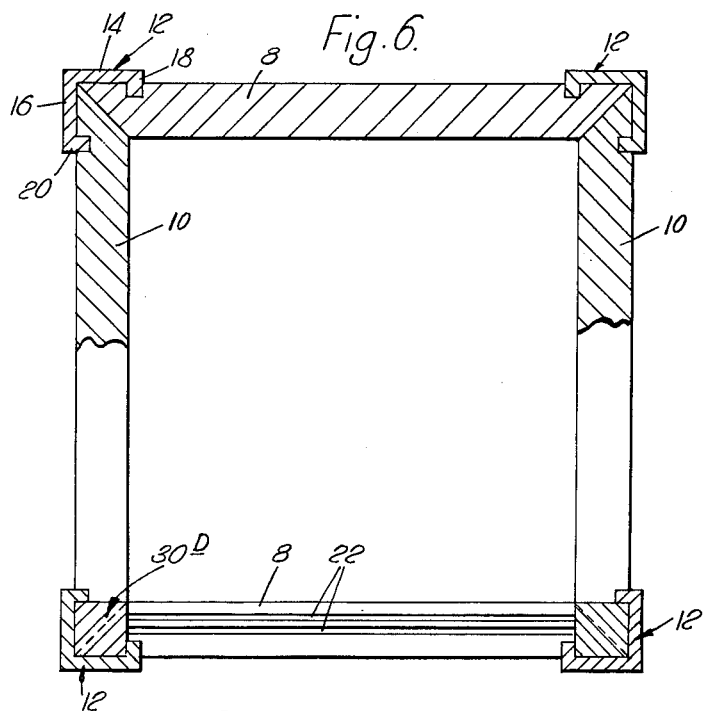
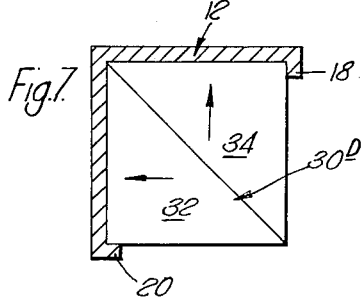
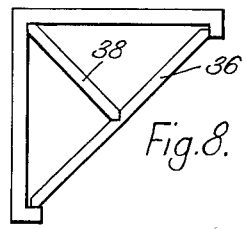
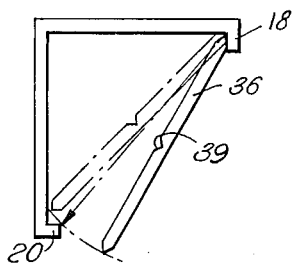
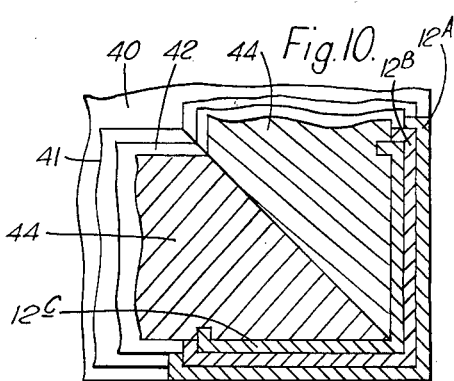
Inventor
Henry George Kewley
By Dowell Dowell
Attorneys United States Patent Office 3,243,245
Patented Mar. 29, 1966

3,243,245
FRAME STRUCTURES AND THE JOINING
OF MEMBERS
Henry George Kewley, Sutton Bridge Farm,
Rochford, Essex, England
Filed Jan. 22, 1963, Ser. No. 253,185
Claims priority, application Great Britain, Oct. 21, 1958,
33,571/58; Dec. 3, 1958, 38,970/58; June 9, 1959,
19,706/59
11 Claims. (Cl. 312—108)

The invention relates to the making of joints, frames and structures, and is a continuation in part of my application Serial No. 847,763 (now abandoned).

The invention is primarily concerned with methods of jointing by which structures ranging from small storage or display cabinets to storied buildings may be erected without requiring the use of any fastening or adhesive.

The invention involves the use of a bracket, clip or rail of a special angle section. Each web of the angle carries a flange and in use the flanges are received in grooves or bear against the sides of rebates or on shoulders formed in or on the parts or part to be joined or otherwise used to engage surfaces which are at angle to one another.

Joints formed in this manner can conveniently be regarded as double tongue and groove joints.

The angle section can only be removed from a joint or frame in accordance with the invention by a relative longitudinal movement. In many cases no special stop will be required to restrain such movement and where restraint is needed the means can be very simple, for example a single nail or screw or even an ordinary ball catch.

The engagement of right angled flanges with surfaces normal to one another on abutting parts to be joined is of itself a restraint on relative lateral movement and only a single movement of one of the parts has to be prevented by other means, which in most cases need be no more elaborate than a simple rebating or mitering. Even this single lateral movement will be prevented by the engagement of flanges which are at an oblique angle to one another with similarly obliquely inclined surfaces on the parts to be joined.

Where the sections have inturned flanges they represent more than half of a closed figure and their successful use and versatility is in large part a consequence of this fact.

An object of the invention is to use joints employing such angle section strips to facilitate the erection of structures such as storage and display cabinets, bookshelves and the like. A further object is to provide a method of erecting such structures very simply and readily to any desired height without the use of standard jointing methods.

A structure in accordance with the invention has at least a top and base frame comprising a plurality of members retained in fixed relation to each other by retaining members each of angle section having two webs with parallel outer edges and formed with simple inturned flanges disposed at right angles along the said outer edges; said top and base frames consisting of a plurality of horizontal rail members having ends in abutting relation and having means therein adjacent their ends receiving the inturned flanges of the vertical retaining members, which latter are disposed in parallel relation, and means for spacing the rails of the top and base frames from each other.

The invention will now be described by way of example with reference to the accompanying drawings in which:

FIGURE 2 is a view similar to FIGURE 1 but with parts of the structure removed to show spacer members;

FIGURE 3 shows, in isometric view, one possible section of the retaining member;

FIGURES 4 and 5 are horizontal sections illustrating joints formed by the retaining member illustrated in FIGURE 3;

FIGURE 6 is a cross section on the line VI—VI of FIGURE 2;

FIGURE 7 is a section showing a vertical spacer for use in the structure shown in FIGURES 1 and 2;

FIGURES 8 and 9 illustrate another form of spacer and the method of assembling it;

FIGURE 10 is a cross section of a corner of a structure built up telescopically from rails of the section shown in FIGURE 3;

Figure 1:
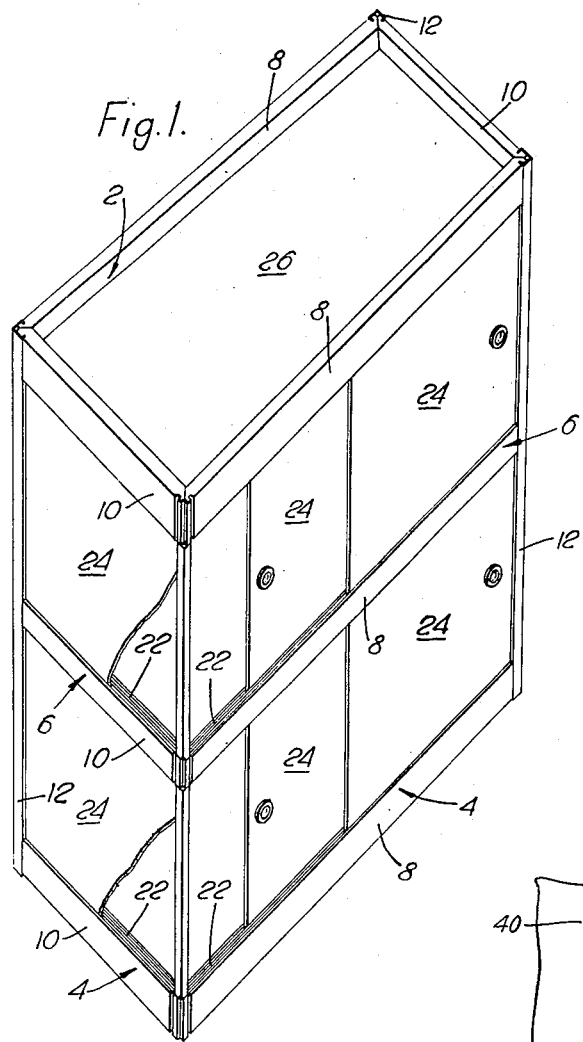
FIGURE 1 is a perspective view of a two tier structure in accordance with the invention.

Referring to the drawings the structure shown in FIGURE 1 is a two tier storage unit comprising a top frame generally indicated at 2, a base frame 4 and an intermediate frame 6. Each frame consists of two side members or rails 8 and two end members or rails 10, the side and end members of each frame being joined together by means of four retaining members 12 having an angle cross section such as that shown in FIGURE 3.

The section of the member shown in FIGURE 3 is by far the most versatile as well as being the simplest. The member can be made in metal or plastic, for example by means of extrusion or rolling or in wood. The angle section of the member has webs 14 and 16 at right angles to one another carrying relatively narrow inturned flanges 18, 20 at their outer edges.

The use of the retaining members 12, the section of which is shown in FIGURE 3, is illustrated in FIGURES 4 and 5 to form a joint between adjacent frame members 8 and 10. The frame members meeting at a corner joint are both formed with a groove or slot adjacent their mating ends to receive the flanges 18, 20 of the retaining member 12. Instead of a groove the members 8, 10 could be provided with an alternative means of preventing longitudinal displacement of the frame members from the retaining member, e.g. each frame member could have a block secured to its outer surface over which the flanges 18, 20 of the retaining member engage. One or both of the mating ends of the frame members are so shaped that relative lateral movement in the one direction permitted by the retaining strip 12 is prevented. That is to say, the mating ends of the frame members, if they were made square, would be capable of moving inwardly away from the angle strips and consequently they must necessarily be shaped so as to engage each other in order to prevent this lateral movement. In the example shown in FIGURE 4 the end of the member 8 is rebated to receive the end of the member 10. In the example shown in FIGURE 5 the two ends are mitred.

It will be appreciated that the joint formed is secure and that the members being joined are prevented from relative movement in any direction in the plane of the frame.

In the structure shown in FIGURE 1 a joint such as that illustrated in FIGURES 4 and 5 is present at each corner of each frame, the members 12 extending between the frames to provide the upright supports for the structure. The upper surface of the base frame members, both upper and lower surfaces of the intermediate frame members and the lower surface of the upper frame members are grooved as indicated at 22 to receive side panels 24. The grooves in one (the front) side member 8 of the frames are arranged so as to receive two panels 24 one in front of the other, the arrangement being such that the panels may be slid relatively to each other as indicated in FIGURE 1 to provide access to the interior of the structure. A floor panel 26 is provided for each frame so that the structure provides separate compartments. The floor panels are each retained in grooves 28 in the side faces of the frame members as shown in FIGURE 2. The side and floor panels may be made of any convenient material, e.g. plywood or glass for the side panels depending upon the use for which the structure is to be put. It will be appreciated that the structure can have any number of intermediate frames depending upon its height and the number of compartments needed or it can have no intermediate frames. Equally if desired the side and/or end panels may be omitted.

The frames 2, 4, 6 of the structure are maintained at the required distance apart by means of spacers (see FIGURE 2) held between the webs 14, 16 of the retaining members 12. The spacers used with the structure shown in FIGURE 1 have their sides grooved to receive the panels 24. A suitable form of spacer is illustrated at 30A in FIGURE 2 (the grooves being omitted). If the structure is not to include side panels then a spacer 30B of larger section appropriately grooved to receive the flanges 18 and 20 may be used.

A simple triangular section spacer can be used and a modification is shown at 30C which is further illustrated in FIGURES 8 and 9.

Where height or other conditions require that the vertical spacers required to separate the successive sets of frames shall be inserted without the possibility of sliding them into position in the members 12 they can be built up within the flanges 18 and 20. One way of doing this is illustrated in FIGURE 7 which shows a spacer 30D formed from two triangular sections 32 and 34 which can be inserted successively within the flanges 18 and 20 of the angle bar 12 in the directions of the arrows, one above the other, the second section being slid down into position alongside the first.

The alternative, shown at 30C in FIGURES 2, 8 and 9 comprises two strips 36 and 38. The strip 36 is designed to fit in the manner shown in FIGURE 8 between the flanges 18 and 20 of the angle bar 12. This strip can be inserted in the manner shown in FIGURE 9 and then locked in position by sliding the strip 38 down into position between the strip 36 and the corner of the bar 12. The strip 36 is grooved at 39 to receive the appropriately shaped edge of the strip 38.

Some idea will be gained of the enormous range of structures to which the angle bars or retaining members 12 shown in FIGURE 2 can be applied as the sole locking members, without any other fastening being required, when it is appreciated that there are a large number of variations on the basic structure any of which can be combined with those already suggested.

Thus for example horizontal partitions can be laid on the frames to form the divisions of a caginet or the floors of a building. In small structures the intermediate frames may be dispensed with and horizontal partitions of sheet material notched at their corners to receive the flanges 18 and 20 may be substituted for them.

Variation is possible in the manner in which the feet of the members 12 are secured. They may, in the case of a permanent building for example, be set in concrete.

Where the structure is too high for the upright members 12 to be in single lengths these can be very simply joined end to end by using spacers which overlap the joints to a substantial extent.

Although great variety is possible in any one type of structure production costs can be greatly reduced by reason of the fact that elaborate designs can in many cases be based upon as few as three standard components, viz. the angle section locking members, panel members and spacer members. Furthermore the structures can very rapidly be assembled without the need for securing parts together with screws, nails or adhesive.

The application of the invention to telescopically erected structures is possible because of the ability of the section of the members 12 shown in FIGURE 3 of fitting within a similar section of larger size with freedom to move only in the longitudinal direction.

Figure 11:
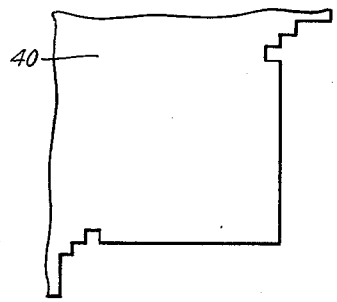
FIGURE 11 is a plan of a corner of a base plate for use in the structure shown in FIGURE 10.

Such a structure is illustrated by FIGURE 10 which shows three uprights 12A, 12B and 12C of the section shown in FIGURE 3 nesting one within another. The whole structure can be erected upon a base plate 40 one corner of which is shown in FIGURE 11 as being designed to accommodate the ends of the three uprights. Frame members 41, 42, and 44 are accommodated by the uprights 12A, 12B and 12C respectively.

One method of erecting such a telescopic structure is to set upright a spacer 30 for the smallest innermost upright 12C on a foundation 40, telescopically to assemble relatively larger uprights 12B and 12A thereon, upright 12A extending the full height of the assembly, upright 12B extending substantially two-thirds of the height, and upright 12C one-third. Then raise upright 12C and its spacer 30 by a hoist lever or other mechanism within intermediate and outer uprights 12B and 12A, after which a second larger spacer having dimensions to fit within upright 12B but not 12C is assembled within the upright 12B below the spacer for upright 12C and the said upright 12B and its spacer is then raised with the upright 12A. A third larger spacer is then assembled in the upright 12A beneath the spacer contained in the upright 12B. Frame rails can be introduced between any two spacers. The important advantage of this method of erection is that all the work can be done from ground level.

Figure 12:
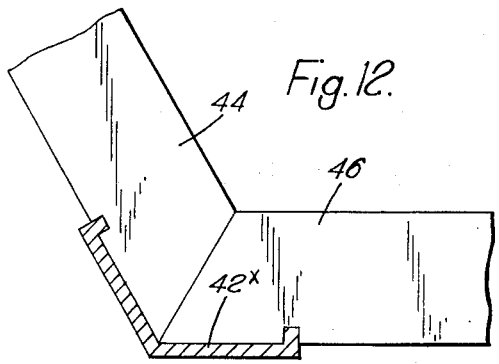
FIGURE 12 is a plan view, partly in section, illustrating a joint of obtuse angle for use in structures in accordance with the invention.

That the frame structures discussed above need not be right angled is clearly demonstrated by FIGURE 12 which illustrates the use of a retaining member 42X to join two rails 44 and 46 at an obtuse angle.

The invention has a range of other uses extending beyond the particular examples cited above. It can for example be applied to the mounting of shelving, by securing parts of the section shown in FIGURE 3 to end boards and mounting appropriately grooved shelf ends in the rails, and to the erection of barred fences and gates, the ends of the bars being appropriately grooved and received in upright retaining members of a section comprising a doubled version of that shown in FIGURE 3.

The invention is unrestricted in its application as regards materials to be used. It is not essential that retaining members for use in accordance with the invention should be straight, curved lengths may have uses in special circumstances.

I claim:

1. A structure having top and base frames each comprising a plurality of members retained in fixed relation to each other by vertical parallel retaining members each of angle section having two webs with parallel outer edges and formed with simple inturned flanges disposed at right angles along the said outer edges; said top and base frames consisting of a plurality of horizontal rail members having ends in abutting relation and having means therein adjacent their ends receiving the inturned flanges of the vertical retaining members, a frame intermediate said top and base frames, said intermediate frame consists of a plurality of horizontal rails having ends in abutting relation and having means therein adjacent their ends receiving the inturned flanges of the vertical retaining members, and spacer means housed between the flanges of the retaining members for spacing the rails of the intermediate frame from the top and base frames and from each other.

2. In a structure as set forth in claim 1 said spacer means comprising vertical spacers having grooves to receive the inturned flanges of the vertical retaining members, said spacers being spaced above and below the intermediate frame and having their outer ends engaging the set of rails of the next adjacent top, base or intermediate frames.

3. In a structure as set forth in claim 2 said spacers being of substantial rectangular cross-section and fitting within the flanges of the vertical retaining members.

4. In a structure as set forth in claim 2 at least one of the intermediate frames serving as a support for a horizontal partition panel.

5. In a structure as set forth in claim 2 said rail members of said frames serving as a support for vertical panel walls.

6. In a structure as set forth in claim 5, at least one of the vertical panel walls comprising a pair of panels arranged for sliding movement in grooves in said rail members whereby access to the interior of said structure may be gained.

7. In a structure as set forth in claim 2 the abutting ends of the rail members of the frames being mitred.

8. In a structure as set forth in claim 2, the flanges of the retaining members being received in grooves in the rails of the frame.

9. In a structure as set forth in claim 2, said means comprising sets of spacers each comprising two complementary triangular sections adapted to be initially and respectively slid successively within the inturned flanges of the vertical retaining member in directions normal to the webs thereof one above the other, the upper section being thereafter slid downwardly into position alongside the lower section to form when so positioned a rectangular bar received within the flanges and webs of the retaining member.

10. In a structure as set forth in claim 2, said means comprising sets of spacers each consisting of two strips, one of which is adapted to be fitted between the inturned flanges of the vertical retaining member and has a central transverse groove to receive the outer edge of the second strip which latter is adapted to be slid down within the groove of the first strip and the heel of the angle of the retaining member.

11. A structure having top and base frames each comprising a plurality of members retained in fixed relation to each other by vertical parallel retaining members each comprising a relatively outer and a relatively inner telescopically erected member disposed in relatively overlapping arrangement, each of said members being of angle section having two webs with parallel outer edges and formed with simple inturned flanges disposed at right angles along the said outer edges, the relatively outer one of said telescopically erected members being of larger cross sectional size than the relatively inner one and closely embracing the end of said relatively inner member within the flanges and web, said top and base frames consisting of a plurality of horizontal rail members having ends in abutting relation and having means therein adjacent their ends receiving the inturned flanges of the vertical retaining members, a frame intermediate said top and base frames, said intermediate frame consisting of a plurality of horizontal rails having ends in abutting relation and having means therein adjacent their ends receiving the inturned flanges of the vertical retaining members, and spacer means housed between the flanges of the retaining members for spacing the rails of the intermediate frame from the top and base frames and from each other.

References Cited by the Examiner

UNITED STATES PATENTS

| | | | |
|---|---|---|---|
| 501,088 | 7/1893 | Leaver | 217—65 |
| 606,911 | 7/1898 | Biele | 312—140 |
| 959,940 | 5/1910 | Hunter | 312—140 |
| 1,130,407 | 3/1915 | Johnson | 312—138 |
| 1,175,127 | 3/1916 | Converse | 217—65 |
| 1,206,331 | 11/1916 | Hunter | 312—107 |
| 2,065,133 | 12/1936 | Heppenstall | 312—108 X |
| 2,365,622 | 12/1944 | Bockius | 312—108 X |

FOREIGN PATENTS

| | | |
|---|---|---|
| 245,035 | 12/1925 | Great Britain. |
| 407,961 | 3/1934 | Great Britain. |

CLAUDE A. LE ROY, *Primary Examiner.*

FRANK B. SHERRY, *Examiner.*

A. FRANKEL, *Assistant Examiner.*